Dec. 15, 1942.  W. B. THOMAS  2,304,862

VARIABLE SPEED TRANSMISSION MECHANISM AND AUTOMATIC CONTROL THEREFOR

Filed Jan. 8, 1940  6 Sheets-Sheet 1

Inventor
Wendell B. Thomas
By his Attorneys

Dec. 15, 1942. W. B. THOMAS 2,304,862
VARIABLE SPEED TRANSMISSION MECHANISM AND AUTOMATIC CONTROL THEREFOR
Filed Jan. 8, 1940 6 Sheets-Sheet 2

Inventor
Wendell B. Thomas
By his Attorneys
Merchant & Merchant

Dec. 15, 1942. W. B. THOMAS 2,304,862
VARIABLE SPEED TRANSMISSION MECHANISM AND AUTOMATIC CONTROL THEREFOR
Filed Jan. 8, 1940 6 Sheets-Sheet 3

Inventor
Wendell B. Thomas
By his Attorneys
Merchant & Merchant

Patented Dec. 15, 1942

2,304,862

UNITED STATES PATENT OFFICE 2,304,862

VARIABLE SPEED TRANSMISSION MECHANISM AND AUTOMATIC CONTROL THEREFOR

Wendell B. Thomas, Minneapolis, Minn.

Application January 8, 1940, Serial No. 312,902

3 Claims. (Cl. 74—472)

My invention relates to variable speed transmission mechanisms and to the automatic control thereof, and provides novel devices and combinations of devices which include among them a selector switch mechanism which switch, while primarily designed for use in conjunction with automatic variable speed transmission mechanisms, as a primary speed ratio selector switch therefore, may be adapted to various different uses.

Whereas, the control mechanism, inclusive of the novel selector switch mechanism hereof, was designed primarily for use in the automatic controlling of variable speed power transmission mechanisms of vehicles propelled by internal combustion engines and is herein illustrated and described primarily as a control for variable speed transmissions of automobiles, buses, trucks, and the like, it should be appreciated that this phase of the invention is readily adaptable to other types of mechanisms.

Among the important objects of the invention is the provision of a selector switch mechanism that is particularly adapted for use in the automatic controlling of variable speed transmission mechanisms such as are present or may hereinafter be employed in motor-driven vehicles, such as internal combustion driven automobiles, trucks, and buses, but which may be employed as a control element in other fields.

Another important object of the invention if the provision of a switch mechanism embodying selective contacts and a relatively movable selector contact and in which contact selecting movements between the selector contact and selecting contacts may be brought about as a result of relative movements between the selector and selecting contacts on either or both of two different paths of movement that are angularly disposed one with respect to the other, and which contact selecting movements on the two different paths may be independently brought about.

A further object of the invention is provision of a selector switch of the general character described and in which the structure is such that the selector contact may be disengaged from any selector contact and re-engaged with any other selector contact without engaging any intermediate selective contact.

An object of the invention is the provision of a control mechanism for variable speed transmission mechanisms of automobiles and the like wherein the shifting of the transmission mechanism from one speed ratio stage to another is accomplished automatically in such a manner that the vehicle engine will automatically be operated at its point of maximum efficiency under various different vehicle speed and engine load conditions, within the limitations imposed by the movement of speed change ratios available for automatic control.

Another important object and advantage of the invention is the provision of an automatic electrical control mechanism for automatically shifting the transmission mechanism of an internal combustion engine propelled vehicle from one speed ratio change to another through two different coordinated controlling factors, namely vehicle speed and engine accelerator position.

The above and numerous other objects and advantages of the invention will be made evident from the following specification, claims, and appended drawings.

In the accompanying drawings, like characters indicate like parts throughout the several views.

Referring to the drawings.

Figure 1:
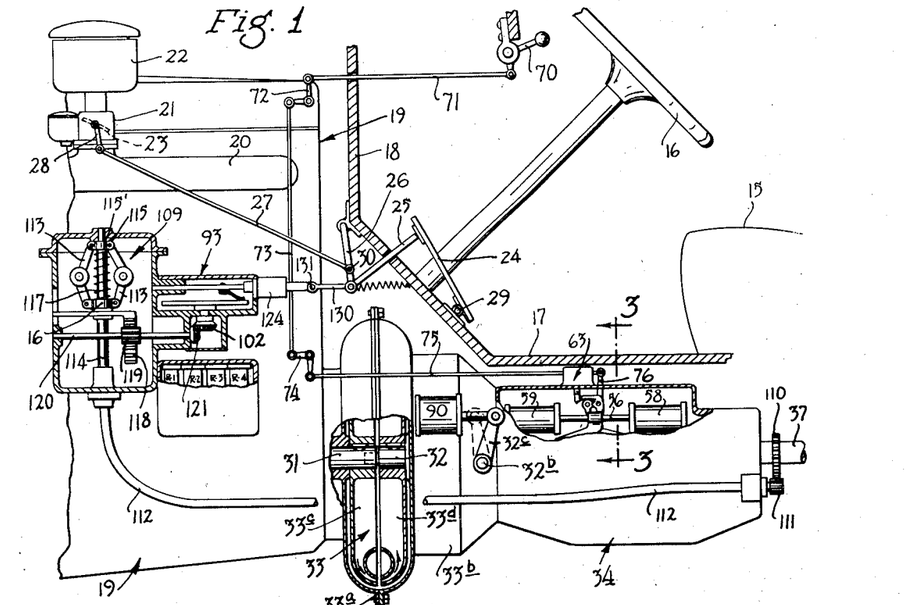
Fig. 1 is a fragmentary view of an internal combustion engine equipped vehicle embodying one form of the invention, some parts being shown in full, some parts being broken away, and some parts being shown in section.

Of the conventional automotive parts previously indicated in Fig. 1, the operator's seat is indicated by 15, a steering wheel by 16, floor boards by 17, the dash board by 18, the vehicle internal combustion engine which may be assumed to be of the gasoline burning type is indicated as an entirety by 19, the engine's intake manifold by 20, the engine's carburetor by 21, a carburetor air cleaner by 22, and the carburetor throttle valve by 23, the throttle valve 23, which is of the butterfly type, is shown as being controllable by the operator through the medium of a foot actuated accelerator pedal 24, and linkage including a push rod 25, a rock arm 26, a rigid link 27 and a bell crank 28 having one end fixed to the axis of the throttle valve 23. The accelerator pedal 24 is pivotally anchored to the floor boards at 29 and slidably engages the end of the push rod 25, which push rod works slidably through the floor 17 and is pivoted at its lower end to the outturned end of the rock arm 26. The throttle valve operating link 27 is pivotally anchored at its rear end to the intermediate portion of the rock arm 26 at 30. The engine's crank shaft, indicated by 31, drives an axially aligned shaft 32 through the medium of a centrifugal fluid type clutch or fly wheel 33 that is illustrated only diagrammatically in Fig. 1, and which is contained within a split housing 33a, the forward half of which is illustrated as being integrally formed with the engine casting. The rear half of the housing 33a is bolted or otherwise rigidly secured to the forward half thereof, and is formed with a rearwardly projecting clutch housing 33B. The fluid clutch, or fly wheel 33 is comprised of two substantially like sections 33c and 33d, the first noted of which is mounted fast on the crank shaft 31, and the last noted of which is mounted fast on the shaft 32. In this type of device, driving engagement between the section 33c and 33d is provided by fluid, usually oil, which permits great slippage between the elements 33c and 33d under minimum engine speeds and has substantially the effect of a positive non-slipping driving under medium high engine speeds. This is the well known type of hydraulic clutch, or fly wheel, currently available as optional equipment on automobiles manufactured by the Chrysler Corporation of Detroit, Michigan.

The shaft 32 drives a coaxially aligned shaft 32a through the medium of a conventional yieldingly set friction clutch, contained within the housing 33b, and the releasing shaft 32b of which projects through the housing 33b and is equipped with a crank arm 32c.

The shaft 32a projects into the transmission case 34, and is journaled in the front wall thereof in a bearing 34a. Formed integrally with the inner end of the clutch shaft 32a is a gear 35, having formed on its rearwardly projecting hub portion a circumferentially spaced series of clutch teeth or dogs 36. Coaxially disposed with respect to the clutch shaft 32 is a driven shaft 37 that is journaled at its forwardly projecting end within the hub of gear 35, and which is journaled near its rear end portion in a transmission case bearing 38. In constant mesh with gear 35 is a larger speed reduction gear 39 that is mounted on a jack shaft 40. The jack shaft 40 is journaled at its opposite ends in case bearings 41. Formed integrally with the gear 39 is another relatively large gear 42 that is in constant mesh with a relatively small idle gear 43 that is rotatively mounted on the shaft 37 in axially spaced relation to the gear 35, and which is similarly formed with radially outwardly projecting clutch teeth or dogs 44. The idle gear 43 is held against axial shifting movements on the shaft 37 by means of a pin or the like 45 projecting through its hub into an annular channel 46 in the shaft 37. Mounted on the shaft 37 between the axially spaced clutch dog equipped hub of gears 35 and 43, is an axially shiftable clutch element 47. This clutch element 47, while free for axially shifting movements on the shaft 37, is spline keyed thereto as at 48, and is formed adjacent at opposite ends with radially inwardly projecting clutch teeth or dogs for cooperation with the clutch teeth or dogs 36 and 44. Integrally formed with gears 39 and 42 are gears 49 and 50 that are respectively engageable with integrally formed gears 51 and 52. The pair of gears 51 and 52 are axially shiftable on the shaft 37, but are spline keyed thereto for common rotation therewith.

Figure 4:
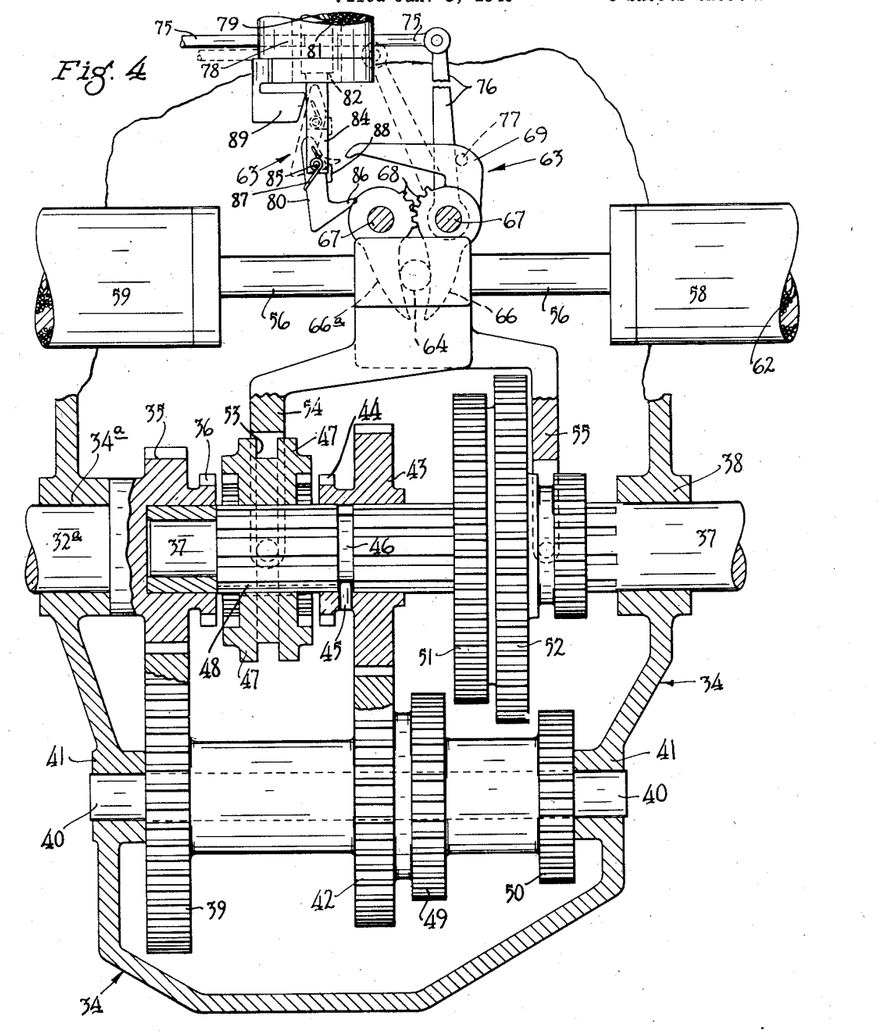
Fig. 4 is an enlarged fragmentary detailed view of part of the transmission and control mechanism of Fig. 1.
Figure 5:
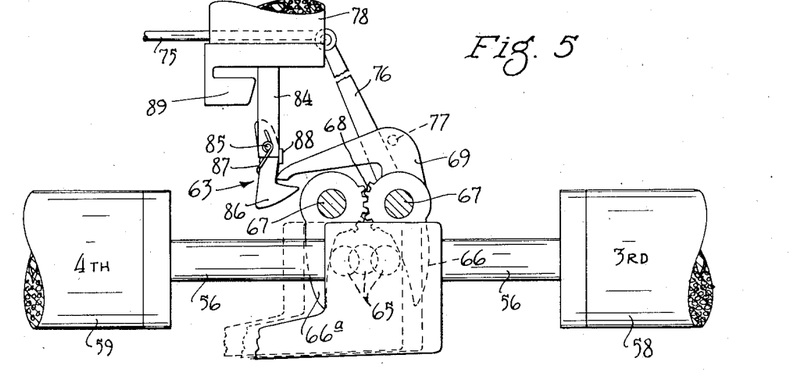
Fig. 5 is a view similar to Fig. 4, but with some of the parts in Fig. 3 omitted or broken away and illustrating other portions of the mechanism.

The transmission parts are shown in Fig. 4 in a neutral position and for the purpose of shifting into the four ratios provided for, the clutch element 47 is provided with a peripheral channel 53 for engagement with a suitable shifter fork 54; and the common hub of gears 51 and 52 is provided with a similar peripheral channel for engagement with a shifter fork 55.

The shifter forks 54 and 55 are respectively mounted on laterally spaced parallel solenoid armature bars 56 and 57. The armature bar 56 has its opposite end portions axially slidably mounted in an opposed pair of solenoid coils 58 and 59, and the armature bar 57 has its opposite end portions axially slidably mounted in an opposed pair of solenoid coils 60 and 61. The solenoid coils 58, 59, 60, and 61 are alike, and are wound on non-magnetic tubes 62, which may be assumed to be of brass, and which tubes form efficient guide bearings for the armature bars 56 and 57. The solenoids 58, 59, 60, and 61 each together with a cooperative armature bar 56 or 57, constitute a power operated motor for shifting the transmission mechanism each to a different speed ratio condition.

Figure 3:
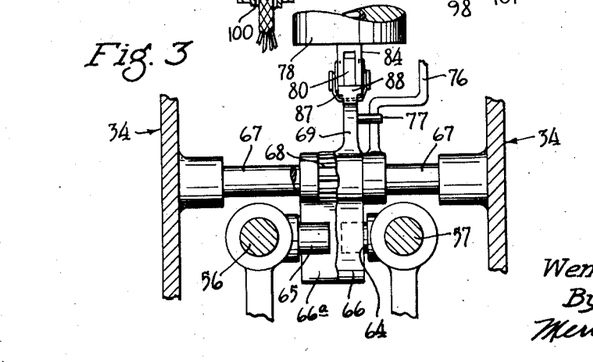
Fig. 3 is an enlarged fragmentary detail view taken on line 3—3 of Fig. 1.
Figure 6:
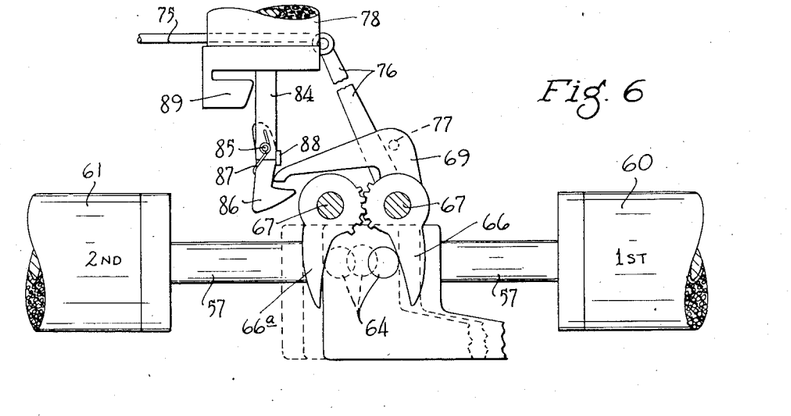
Fig. 6 is a view similar to Fig. 5, but with some of the parts of Fig. 5 broken away and showing certain other portions of the mechanism.

Returning of the transmission to the neutral condition shown in Fig. 4 is accomplished by means of a neutralizing mechanism indicated as an entirety by 63, which will later be described. When the solenoid coil 60, representing first speed or the highest ratio of motor to vehicle speed, is energized, the solenoid 57 will be moved toward the right in respect to Figs. 4, 5, 6, and 7 (see particularly Fig. 6) thereby moving the gear 52 through the medium of the shifter fork 55, into mesh with its cooperating gear 50. This will result in driving of the shaft 37 from the shaft 32 through the following gears, to wit: gear 35 to gear 39 to the integrally formed gear 50, which now being in mesh with gear 52 will drive the shaft 37 through said gear 52 and the spline key driving connections therewith to the drive shaft. The shaft 37 will now, of course, be driven at a greatly reduced speed with respect to the shaft 32. Moving of the pair of gears 51 and 52 back to their neutral condition as shown in Fig. 3 is accomplished as previously indicated through the neutralizing mechanism 63. When the solenoid coil 61, which represents the second speed of the transmission mechanism, is energized, the armature bar 57 will move to the left to the extent necessary to bring the gear 51 into mesh with its cooperating gear 49, which will result in driving of shaft 37 from shaft 32 through gears 35, 39, 49, and 51. Energization of solenoid 58 will cause armature bar 56 to move to the right from a neutral position, which will result in shifting of the clutch element 47 into interlocking engagement with the clutch teeth 44 on gear 43. This shift, which represents the third gear or ratio of the transmission mechanism results in driving of the shaft 37 from shaft 32 through gears 35, 39, 42, 43, and clutch element 47. When the solenoid 59 is energized, the armature bar 56 is moved to the left from a neutral position, with the result that the clutch element 47 will become interlocked with the clutch teeth 36 on gear 35, and directly couple the shafts 32 and 37 together for driving at a one to one ratio, which represents fourth speed of the transmission mechanism.

Whereas, no attempt has been made to accurately proportion the gears in the transmission to represent any particular ratios, it may be assumed for the purpose of example, that the four speeds of the transmission mechanism are capable of an overall variation in ratio between shafts 32 and 37, of from approximately three and one-third (3⅓) to one (1) ratio in low gear to a one to one (1 to 1) ratio in fourth gear, and that each successive stage varies the ratio in approximately the same proportion. It will, of course, be appreciated that the extent of speed ratio variation may be varied to any desired extent and that the overall variation may be divided up into any desired number of steps or stages; four speed ratio stages having been chosen merely for the purpose of example.

The neutralizer mechanism 63 includes a pin 64 rigidly anchored to and projecting from the intermediate portion of the armature bar 57 and a similar pin 65 that is rigidly anchored to and projecting from the intermediate portion of the armature bar 56. These pins, 64 and 65, project into close relation one to the other, and are directly opposed when the shifter mechanism is in neutral position. For engagement with these pins, there is provided an opposed pair of shifter fingers 66 and 66a, each of which is mounted fast on a different one of a pair of journaled shafts 67. The hub portions of the fingers 66 and 66a are formed with inter-meshing gear segments 68, which cause the same to move in unison, but in opposite directions.

The shifter fingers 66 and 66a, as will be seen particularly by reference to Fig. 3, are each of sufficient width to overlap the path of movement of each of the oppositely disposed pins 64 and 65. The finger 66 serves to return the mechanism to neutral position from either its first or third speed, and the finger 66a serves to return the mechanism to neutral position from either second or fourth. The hub portion of the finger 66 is integrally formed with actuating lever 69.

Manual operation of the neutralizer fingers 66 and 66a can be accomplished by the operator through the medium of linkage comprising a bell crank 70, a rigid link 71, a bell crank 72, a rigid link 73, a bell crank 74, a rigid link 75, and an operating arm 76 that is loosely journaled on the shaft 67 on which finger 66 is rigidly mounted. The manually operated neutralizing linkage further includes a driving pin or lug 77 that is rigid on the actuating lever 69, and projects into the path of movement of the arm 76. Manual neutralization of the intermediate mechanism from any gear, or speed ratio, can be accomplished by manipulating the crank 70 to move the arm 76 from the dotted line position of Fig. 4, or the full line position of Figs. 5 and 6, to the full line position of Fig. 4, which is through engagement of arm 76 with lug 77 and will cause the fingers 66 and 66a to move from and spread apart in the position shown in Figs. 5 and 6 to their closed positions shown in Fig. 4. Of course the movement of these fingers from their spread to their closed positions will, through engagement of one of said fingers with either one of the pins 64 or 65, be moved in either direction from its neutral position to move back to its neutral center position.

For automatically moving the neutralizing fingers 66 and 66a back to their neutral positions from any speed ratio position, the neutralizing mechanism 63 further includes a power operated device including a solenoid coil 78, magnetically responsive plunger 79, and a latch element 80. The solenoid coil 78 is wound on a non-magnetic tubing 81, which forms a guide for the axially movable plunger 79. Downward movements of the plunger 79, under the influence of gravity, are limited by engagement thereof with inturned annular flange 82 at the lower end of the tube 81, and upturned movements of the plunger 79, under the action of gravity, are limited by engagement of the plunger with a magnetic plug-like core 83 that is screw threaded into the upper end of the tubing 81. The plunger 79 is formed with a stem 84 that works slidably through the reduced diameter 82 of the guide tube 81, and carries the latch element 80, which latch element 80 is pivoted to the stem 84 at 85 (see particularly Fig. 4). The latch element 53 is normally dropped to its lower portion, shown by full lines in Fig. 4, and is provided at its lower end with a latch lug 86 that is normally disposed in the path of movement of the free end of the actuating lever 69. The latch element 80 is normally maintained in the position shown by full lines in Fig. 4, and wherein its lug 86 is in the path of movement of the free end of the lever 69, by means of a spring 87, movements in this direction being limited by engagement of the element 80 with a stop 88 that is rigid with the stem 84. The upper end portion of the latch element 80 above the pivot 85 projects outwardly beyond the stem 84 when the latch element is in its lower position shown in Fig. 4, but under upward movements of the stem and plunger 79, as a result of energization of the solenoid coil 78, this upper end of the latch element 80 becomes engaged with the tapered cam surface of a cam lug 89, and is moved substantially into alignment with the plunger, which movement results in retraction of the latch lug 86 out of the path of movement of the free end of the actuating lever 69 (see dotted line position of latch 80 in Fig. 4).

As a power operating medium for the conventional clutch, there is provided a clutch operated solenoid coil 90 that is equipped with a magnetically responsive plunger rod 91 that is pivotally anchored to the free end of the clutch release arm 32c at 92. Under energization of the solenoid 90, the plunger 91 is retracted into the solenoid coil and this movement causes the clutch release crank arm 32c to move from its clutch set position shown by full lines in Figs. 1 and 7, to its clutch release position shown by dotted lines in Figs. 1 and 7.

The selector switch shown in Figs. 1, 2, 7, and 8, and which is indicated as an entirety by 93, includes a plurality of selective contacts 94, 95, 96, and 97, and a selector contact 98. The selective contacts 94 to 97 inclusive are carried by and mounted on a disc-like selective contact carrier 99 in circumferentially spaced relation one to another. This selective contact-carrying disc is mounted fast on the upper end of a tubular shaft 100 that is rotatively mounted in a bearing formed in the bottom of a switch housing 101. Below the bearing of the housing 101, the tubular shaft 100 is equipped with a beveled gear 102, which is mounted fast thereon.

The selector contact 98 is carried by a guide bar 103 through the medium of a spring finger 104 that is made fast, but is electrically insulated from the guide bar 103. The guide bar 103 extends completely through the switch housing 101, is cross sectionally annular and is axially slidably mounted in guide bearings 104'. This guide bar is disposed in laterally spaced parallel relation to the contact carrying face of the disc 99 and is radial of the axis of said disc. The contact carrying disc 99 is formed of electrical insulating material and the contacts 94 to 97 inclusive are embedded therein, so that the flat top surfaces thereof are flush with the top of the surrounding insulating material of the disc, thereby dividing the exposed top surface of the disc into circumferentially spaced contact areas represented by the top faces of the contacts 94, 95, 96, and 97, contact spacing areas or strips 105, 106, and 107, and a neutral zone 108 of insulating material radially outward of the several selective contacts. The contacts 94 to 97 inclusive are shown as extended radially outwardly from points on the disc 99 very close to the axis thereof outwardly to the neutral area or zone 108, which zone or area, as illustrated, is located in the peripheral portion of the disc 99 and is completely annular in form. The several selective contacts 94 to 97 inclusive may be of various different shapes circumferentially of the disc 99 depending on the performance characteristics required, but for the purpose of the present example, have the peculiar shapes illustrated best in Fig. 8.

The relative rotary movements between the selective contact carrying disc 99 and the selector contact under variations in vehicle speed by a speed responsive actuator is in the nature of a centrifugal governor 109 that is actuated from the shaft 37 through suitable driving connections roughly illustrated as comprising a gear 110 on the shaft 37; a gear 111 meshed with gear 110, and a flexible cable drive 112 of the character generally employed for driving speedometers and the like. The governor 109 comprises toggle arms 113 that are pivotally anchored to a shaft 114, through the medium of a fixture 115', at 115. The lower ends of the opposite toggles are pivoted to a fixture 116 that is axially slidable on the shaft 114. The fixture 115 is mounted fast on the shaft 114 so that the toggles will rotate with the shaft. The toggles 113 are weighted at their pivotally jointed intermediate portions so that they will tend to move outwardly under centrifugal action and thereby cause upward sliding movement of the fixture 116 on the shaft 114. A compression spring 117 is interposed between the governor fixtures 115 and 116, and this tends to keep the fixtures in their maximum spread relation. Rigidly carried by the axially slidable governor fixture 116 is a gear rack 118 that meshes with a pinion 119. The pinion 119 is mounted fast on a journaled shaft 120 carrying a beveled gear 121 that meshes with the beveled gear 102.

Through the action of the governor and its actuating connections to the rotary selective contact carrier 99, the said contact carrier will be rotated to different positions in response to variations in vehicle speed; the arrangement being such that the carrier will rotate through approximately 360° under variations in vehicle speed from zero to maximum vehicle speed.

The selector contact 98 is normally, that is when the engine is at rest or idling, positioned on the neutral area 108 of the contact carrier, but under endwise shifting movements of the rod 103, the selector contact is movable radially of the contact carrier to the axial portion of the contact carrier whereat the selective contacts terminate. Radial outward movements of the contact 98 with respect to the contact carrier are limited by engagement of a stop collar or the like, 122, on the guide rod 103 with the bearing 104, and the guide rod is yieldingly biased to its radially outermost position just above described, by means of a compression spring 123 that is contained within a dash pot 124. The guide rod 103 is equipped within the dash pot 124 with a sealing cup 125 and the said dash pot is provided with an inwardly opening check valve 126 from atmosphere and an outwardly opening check valve 127 to atmosphere. The check valve 127 permits free discharge of air from the dash pot under inward movements of the sealing cup or piston 125, whereas the inwardly opening check valve 126 restricts the inlet of air to the cylinder or dash pot 124 sufficiently to retard return movements of the selector contact 98 to the desired extent, under the action of spring 123.

The guide rod 103 is operatively connected to the engine's throttle valve controlling accelerator linkage through the medium of linkage comprising a tubular link 128 telescopically applied over the rearwardly extended end 129 of the guide rod 103, and a rigid link 130 connecting the closed end of the tubular link 128 to the swinging end of the rock arm 26. The links 128 and 130 are pivotally connected at 131. By means of this linkage, 128 to 131 inclusive, the rod 103 and selector contact 98 will be shifted automatically with relation to the selective contacts as a result of accelerating and decelerating adjustments of the engine's throttle valve by the vehicle operator and the positioning of the selector contact 98 between its two extreme positions will be in proportion to throttle valve position. The slip connection afforded by telescoping action of the tubular link 128 on extension 129, permits the accelerator linkage to be rapidly withdrawn in a direction of deceleration rapidly and independently of the selector contact which in such instances will be returned by the spring 123 at relatively retarded speed. However, in a direction of acceleration, the selector contact will always be advanced in direct proportion to the rapidity of acceleration.

From the description of the selector switch mechanism 93, it will be evident that there are two distinct adjusting movements of the selective contacts with respect to the selector contact, or vice versa, and that these two movements are on two different paths that are angularly disposed one with respect to the other. Furthermore, it will be evident that the one of these movements is rotary, which causes a relative movement between the selective contacts 94 to 97 inclusive, and the selector contact 98, on a rotary path as a result of vehicle speed variation; whereas the other movement, which is in this instance the direct result of changed accelerator positions, is on a straight line path which path is angularly disposed with respect to the rotary path.

Preferably the selector switch mechanism controls the power-operated shifting mechanism through the medium of relay switch mechanisms R1, R2, R3, R4, each of which represents a different speed ratio of the transmission mechanism. Each of the relays R1 to R4, inclusive, include cooperating normally open switches 133, 134, and 135 and normally closed switches 136, 137, and 138.

*Operation of Figs. 1 to 8 inclusive*

Figure 7:
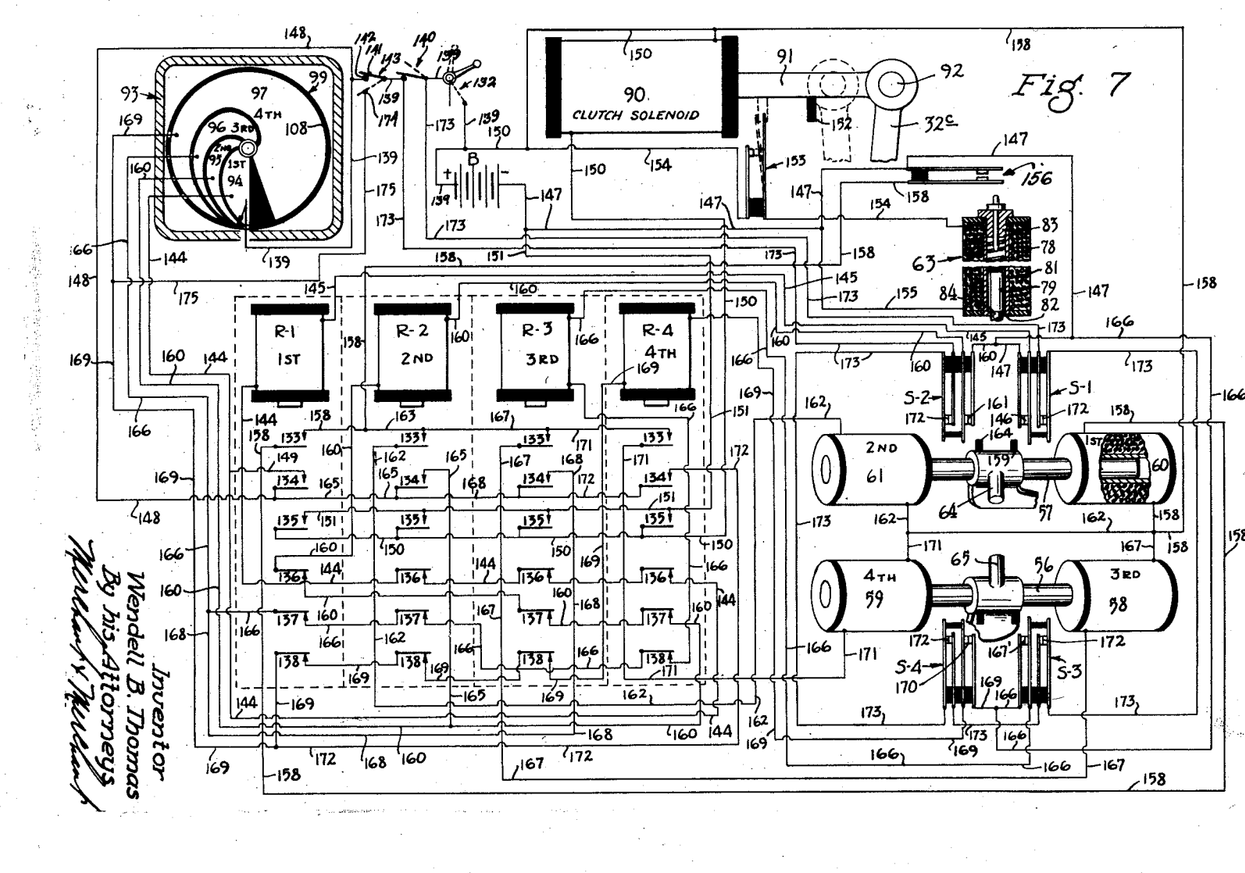
Fig. 7 is a diagrammatic view illustrating the electrical hook-up of the various elements of the transmission operating and control mechanisms of the form of the invention shown in Figs. 1 to 6 inclusive.
Figure 8:
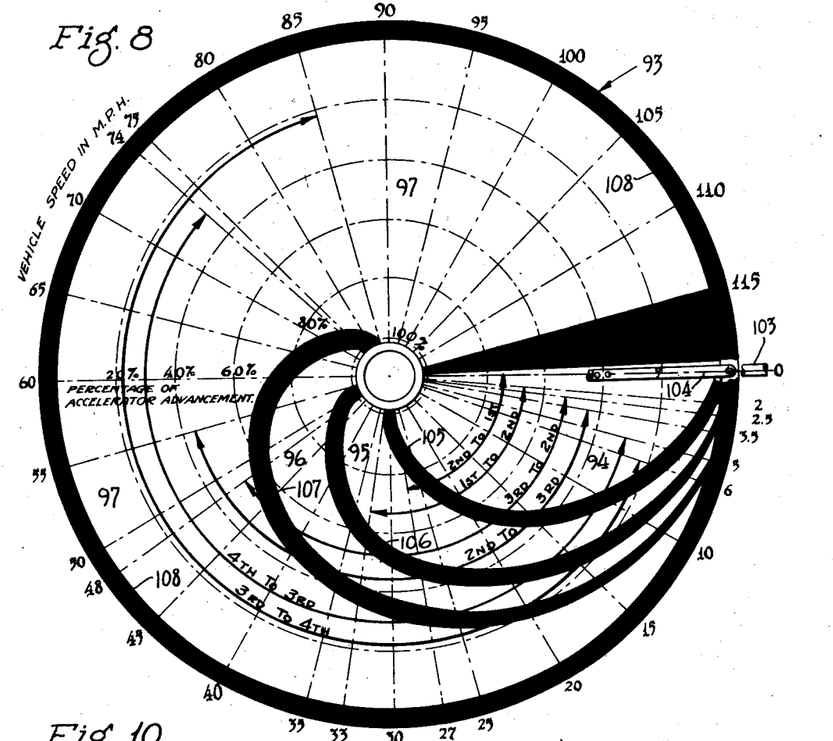
Fig. 8 is an enlarged detail view in top plan of the selective contact carrier of Figs. 1, 2, and 7.

When the vehicle is stationary and the engine at idle, or in inoperative condition, the parts will be positioned as shown by full lines in Figs. 1 to 4 inclusive, 7 and 8, and by reference to Fig. 8 it will be seen that under the conditions just named, the selector contact 98 will be positioned in the neutral area 108 of the selector contact carrying disc 99, but in radial alignment with the radially straight side of selective contact 94. At this point, attention is directed to the fact that on Fig. 8 broken radial lines indicate various different degrees of rotation of the selective contact carrying disc 99 under different vehicle speeds, these broken radial lines being marked adjacent the periphery of the disc 99 in numerals representing speed in miles per hour. By reference to Fig. 8, it will be seen that when the vehicle is stationary the disc 99 will be positioned with the radial line representing zero miles per hour in direct alignment with the path of travel of the selector contact 98. Under increased speed from zero upward, the disc 99 will move in a counterclockwise direction with respect to the contact 98. From this it will be seen from the position of the parts illustrated in Fig. 8, the contact 98 is in alignment with the lowest speed position of the first speed selective contact 94.

Assuming now that the motor of the vehicle has been started, and is running at idle, operation of the vehicle in a forward direction will be as follows: The operator will first move the lever 70 from the position shown by full lines in Figs. 1 and 7 to the dotted line positions shown in Figs. 1 and 7, which will in turn result in mechanically moving the lever 76 to its dotted line position of Fig. 4, wherein it is free of the pin or lug 77 of Fig. 4. This leaves the neutralizing fingers 66 and 66a free to be spread apart. Another function resulting from shifting of the manual neutralizing lever 70 to its forward position is the automatic simultaneous closing of a switch 132, which, being interposed in the positive lead of the vehicle's storage battery B, renders the electrical selector and operating mechanism operative. The switch 132 constitutes a master switch and is simply closed manually prior to calling on the mechanism for automatic operation and is left in closed position until it is desired to render the mechanism completely inoperative.

Now, to start the vehicle moving in a forward direction, the operator will simply step on the accelerator pedal 24 to gradually open the engine's throttle valve and increase the speed of the engine. As the throttle valve is opened under the action of the accelerator 24, the selector contact 98 will move radially inwardly over the selective contact-carrying disc 99 from its position shown in Fig. 8, wherein it is on the neutral area 108, onto first speed selective contact 94. The initial engagement of the selector contact 98 with the selective contact 94 will close a controller circuit comprising a lead 139 from the positive side of the battery B and having interposed therein the now closed master switch 132 and a normally closed manually operated switch 140 and contacts 141 and 142 of a two-position switch 143, selector contact 98, selective contact 94, a lead 144 having interposed therein the normally closed switches 136 of relays R4, R3 and R2, the solenoid coil of relay R1, a lead 145, normally closed contacts 146 of a switch S1, and a lead 147, which returns back to the battery B at the negative side thereof.

The circuit through the coil of the relay R1 now being energized, the normally open switches 133, 134, 135 of the relay R1 will be instantaneously closed and the normally closed switches 136, 137 and 138 of the relay R1 will simultaneously be opened. The closing of the switch 134 of the relay R1 establishes a holding circuit for the relay R1 independent of the selector switch 93, and which holding circuit comprises the lead 139, switch 132, switch 140, switch contacts 141 and 142 of the switch 143, a lead 148, now closed switch 134 of the relay R1, a lead 149, the lead 144 through the closed switches 136 of the inoperative relays R4, R3 and R2 to the coil of the relay R1, lead 145, contacts 146 of the switch S1, a lead 147 and back to the negative side of the battery B. As a result of the establishing of this holding circuit, the coil of the relay R1 will be maintained energized independently of the contacts of the selector switch 93. The closing of the switch 135 of the relay R1 results in energization of the clutch-operating solenoid 90 through a circuit comprising part of the lead 139, a lead 150 having interposed therein the coil of the solenoid 90, the plunger-like armature bar 91 will be retracted into the solenoid, thereby moving the clutch-releasing arm 32c to its clutch release position; wherein the shaft 32a will be disengaged from the shaft 32, see dotted lines in Figs. 1 and 7. The solenoid armature bar or plunger 91 carries a switch-operating lug 152 of insulating material which, under final clutch-releasing movements, engages one of the spring contact fingers of a normally open switch 153 and closes said switch 153. The closing of this switch 153 establishes a circuit through the neutralizer solenoid 78 consisting of part of the lead 150, a lead 154 through the now closed switch 153, the solenoid coil 78, a lead 155 and part of the lead 147 returning to the battery. As a result of this energization of the solenoid 78 of the neutralizing mechanism 63, the plunger 79 and latch 86 will be raised from their lower positions shown by full lines in Fig. 4 to their dotted line positions of Fig. 4, but in this particular instance, this actuation of the neutralizer latch will perform no function, insofar as neutralization of the transmission mechanism is concerned, since the transmission elements are already in neutral condition. However, the raising of the plunger 79 to its upper position does result in the closing of a switch 156 through the medium of a push rod 157 that is axially slidable in the core plug 83 of the solenoid 78 and is engaged by the plunger 79 under upward movements and is extended into engagement with one of the yielding contact fingers of the switch 156. The closing of this switch 156 completes a circuit through the gear-shifting solenoid 60, which circuit was previously initiated but not completed by the closing of the switch 133 of the relay R1. This last named circuit comprises part of the lead 139, part of the lead 150, a lead 158 having interposed therein the solenoid 60, the now closed switch 133 of the relay R1, the now closed switch 156, and part of the lead 147 back to the battery. Upon energization of the shifting solenoid 60, the armature bar 57 will move from its centered neutral position to its extreme right-hand position shown by full lines in Fig. 6, which will result in the shifting of the first speed gear 56 into engagement with the first speed gear 50. Also under this movement of the armature bar, the neutralizer pin 64 will engage the neutralizer finger 66 and move the same and the neutralizer finger 66a to their spread-apart positions shown by full lines in Fig. 6. Under final shifting movements of the armature bar 57, a rigid lug 159 thereon will engage the switch S1 and open the cooperating contacts 146 thereof with the result that the holding circuit of the relay R1 will be broken, thereby de-energizing the relay R1 and permitting the switches 133 to 138 inclusive thereof to return to their normal positions shown in Fig. 7 and in which positions the switches 133, 134 and 135 of the relay R1 are open and the switches 136, 137 and 138 of said relay R1 are closed. The opening of the switch 135 of the relay R1 interrupts the circuit of the clutch-operating solenoid 90, which permits the clutch to be yieldingly set, thereby coupling the shaft 32 to the shaft 32a, with the result that the driven shaft 37, which is assumed to be connected to the driving wheels of the vehicle, will be driven from the engine through the first speed transmission gears. Of course, under clutch-engaging movements of the clutch-operating elements 91, 12 and 32c, the neutralizer control switch 153 will be permitted to open and de-energize the neutralizer solenoid 78, which de-energization will result in returning of the plunger 79 and neutralizer latch to its lower position shown in Fig. 6. In dropping to its lower position, the latch 80, which projects into the path of movement of the neutralizer lever 69, will strike the free end of said lever and, by camming action, will move on its pivot 85 and pass around the end and under the free end of the lever 69.

The vehicle is now moving in first transmission speed ratio and will remain in low until the selector contact 98 engages one of the other selective contacts 95, 96, or 97, at which time the transmission mechanism will be shifted first to neutral and then to the speed ratio represented by the next engaged selective contact, attention being directed at this time to the fact that, just as the contact 94 represents first speed of the transmission, the contact 95 represents the transmission's second speed, the contact 96 represents the transmission's third speed, and the contact 97 represents the transmission's fourth speed. Furthermore, attention is directed to the fact that, due to the relay-holding circuit described, shifting out of low gear, for example, will not be effected by disengagement of the contact 98 from its engaged selective contact, but that the next shifting operation requires engagement of the selector contact with another selective contact. Of course, under increased vehicle speed from the time the transmission has been shifted into low gear and the vehicle started in motion, the selective contact-carrying disc 99 will be progressively rotated in a counter-clockwise direction in respect to Fig. 8 in direct proportion to such increase in speed. Under this counter-clockwise movement, of the selective contact disc with respect to the selector contact 98, the selective contact 94 will be rotated out of engagement with the selector contact 98 and the selector contact 98 will pass first onto the insulated space 105 between the contacts 94 and 95 and then onto the selective contact 95. As previously indicated, the disengagement of the selector contact 98 from the selective contact 95 will have no result, but engagement of the selector contact 98 with the selective contact 95 will result in the transmission mechanism's being shifted out of first speed and into second speed. The sequence of operations resulting from engagement of the selector contact 98 with the selective contact 95 will be as follows:

A. The relay R2 will be energized through a circuit comprising the lead 139, contacts 141 and 142 of the switch 143, the lead 139, selector contact 98, selective contact 95, a lead 160 having interposed therein the now closed switches 137 of the relays R4 and R3 and the now closed switch 136 of the relay R1, the coil of the relay R2 and the now closed contacts 161 of a switch S2, and the lead 147 back to the battery B, thereby energizing the relay R2 and closing the switches 133, 134 and 135 thereof and opening the switches 136, 137 and 138 thereof.

B. As a result of the closing of the switch 135 of the relay R2, the clutch-operating solenoid 90 will be energized through the same circuit as before described in connection with the operation of the clutch in shifting to first speed; it being noted that the clutch-solenoid-control switches 135 of the relays R1, R2, R3, and R4 are connected in parallel across the leads 150 and 151. The clutch will now be disengaged.

C. The moving of the clutch-operating mechanism to neutral position will cause the neutralizer-controlling switch 153 to be closed, which will in turn result in the closing of the before described circuit of the coil 78 of the neutralizer mechanism, which energizes the neutralizer coil and cause the magnetically influenced elements thereof to move to their upper positions. Under this upward movement of the magnetically influenced elements of the neutralizer mechanism, the latch 86 will carry with it the free end of the neutralizer lever 69, which will move the neutralizer fingers 66 and 66a together and cause, by engagement of the neutralizer pin 64 with the neutralizer finger 66, the shifting of the low speed gear 52 to its neutral position. Of course, as soon as the latch element 86 reaches its uppermost position, it will be pivotally retracted by the cam lug 89 out of engagement with and out of the path of travel of the free end of the neutralizer arm 69, which will leave the neutralizer arm free to move pivotally downwardly without interference by the neutralizer latch.

D. Also, as a result of the energization of the neutralizer coil 78 and the upward movement of the magnetically responsive neutralizer elements, the switch 156 will be closed by the push rod 157, which will complete a circuit through the second speed shifting solenoid 61, and which circuit was initiated by the closing of the switch 133 of the relay R2. This circuit of the second speed solenoid 61 is as follows: part of the lead 139, the lead 150, the lead 158, a lead 162 which includes the solenoid coil 61, the switch 133 of the relay R2, and a lead 163, the lead 158, the switch 156 and the lead 147. The shifter solenoid 61 now being energized will cause the armature bar 57 and parts coupled thereto to move to their extreme left-hand positions, thereby shifting the transmission mechanism from neutral into second speed and opening the contacts 161 of the switch S2 by engagement of one of the fingers with the switch S2 by a switch-operating lug 164. This opening of the contacts 161 of the switch S2 will break a holding circuit through the relay R2, which was closed by the switch 134 of the relay R2, just subsequent to energization of the coil of the relay R2 by engagement of the selector contact 98 with the selective contact 95, and which circuit was as follows: the lead 139 to the lead 148, the lead 165 having interposed therein the switch 134 of the relay R2, part of the lead 160 (including the switches 137 of the relays R4 and R3 and the switch 136 of relay R1 and the coil of the relay R2 and contacts 161 of the switch S2), and the lead 147 back to the battery. This opening of the switch contacts 161 not only opens the relay-holding circuit just described, but also opens the initial relay-energizing circuit which included the selector switch contacts 98 and 94.

E. As a result of this de-energization of the relay R2, the several switches thereof will be returned to their normal positions, which will result in de-energization of the clutch-operating solenoid 90 which permits the clutch to return to its set driving position and which, in turn, results in opening of the switch 153.

F. This opening of the switch 153 de-energizes the neutralizer solenoid 78. The neutralizer solenoid 78 being now neutralized permits the return of the latch 86 to its lower normal position, during which movement the latch will cam over the free end of the neutralizer arm 69 and come to rest as shown, for example, in Fig. 6.

Of course, the vehicle will now be driven in second gear until the selector contact 98 engages some other one of the selective contacts 94, 96, or 97.

If we assume now that the vehicle increases speed in second gear and that the accelerator-controlled selector contact is maintained stationary and in a position radially inward of the neutral area 108 of the selective contact disc 99, it will be obvious that the relative rotary movement between the selector contact 98 and the selective contact will cause the selective contact 95 to be moved out of engagement with the selector contact 98 in a counter-clockwise direction. Upon leaving of the selective contact 94 in a direction of increased speed, the selector contact will first engage the neutral strip 106 between the contacts 95 and 96 and will then engage the selective contact 96. Due to the holding circuit for the relay R2, the transmission mechanism will be retained in second speed until contact is actually made between the selector contact 98 and the selective contact 96, at which time the transmission mechanism will be shifted into third speed as a result of the following sequence of operations:

A. The relay R3 will be initially energized, by closing of a circuit comprising the lead 139, the selector contact 98, the selective contact 96, a lead 166 (which includes the now closed switches 137 of the relays R1 and R2, the now closed switch 138 of the relay R4, the coil of the relay R3, and the now closed contacts 167' of a switch S3), and the lead 147 back to the battery. As a result of this energization of the relay R3, the switches 133, 134 and 135 thereof will be closed and the switches 136, 137 and 138 will be opened.

B. The closing of the switch 135 of the relay R3 results in the closing of the before-described circuit of the clutch-operating solenoid 90, which will result in release of the conventional friction clutch and closing of the switch 53.

C. The closing of the switch 53 as a result of clutch-releasing movements of the clutch-operating linkage results in closing of the before-described circuit through the relay 78, energization of which relay results in upward retraction of the latch 86 and consequent shifting out of second speed into neutral.

D. Also as a result of energization of the neutralizer coil 78, the switch 156 is closed and results in the final closing of a circuit for the third speed shifter solenoid 58, which circuit was previously initiated by closing of the switch 133 of the relay R2 and is composed as follows: a part of the lead 139 from the positive side of the battery, the lead 150, the lead 158 to a lead 167 (which includes the shifter solenoid 58 and the now closed switch 133 of the relay R3), the lead 163 to the lead 158, the lead 158 from the lead 163 to the switch 156, the switch 156, and the lead 147 back to the battery. The transmission mechanism will now be finally shifted into third speed and the contacts 167' of the switch S3 will be broken, thereby interrupting the initial circuit through the relay R3 which included the selector switch contacts 98 and 96 and also interrupting a holding circuit through the relay R3, which latter was made previously as a result of the closing of the switch 134 of the relay R3. This holding circuit, which has just been opened by the breaking of the switch contacts 167', was composed as follows: the lead 139 from the battery to the lead 148 to the lead 165, a lead 168 having interposed therein the switch 134 of the relay R3, the lead 166 (including the switches 137 of the relays R1 and R2, and the switch 138 of the relay R4 and the coil of the relay R3 and the contacts 167' of the switch S3), and the lead 147 back to the battery.

E. As a result of this de-energization of the relay R3, the several switches thereof will be returned to their normal positions, which will result in de-energization of the clutch-operating solenoid 90 which permits the clutch to return to its set driving position and which, in turn, results in opening of the switch 153.

F. This opening of the switch 153 de-energizes the neutralizer solenoid 78. The neutralizer solenoid 78 being now neutralized permits the return of the latch 86 to its lower normal position, during which movement the latch will cam over the free end of the neutralizer arm 69 and come to rest as shown, for example, in Fig. 6.

Now if, as a result of still further increased vehicle speed or changed accelerator position, the selector contact 98 is made to engage the fourth speed selective contact 97, the transmission mechanism will be shifted to fourth speed, or direct drive in this instance, as a result of the following sequence of operations:

A. The lead 139, the selector switch contacts 98 and 97, a lead 169 (which latter includes the now closed switches 138 of the relays R1, R2, and R3, the coil of the relay R4, and the now closed contacts 170 of the switch S4), the lead 166 from the lead 169 to the lead 147, and the lead 147 back to the battery. As a result of this energization of the relay R4, the switches 133, 134 and 135 thereof will be closed and the switches 136, 137 and 138 thereof will be opened.

B. As a result of the closing of the switch 135 of the relay R4, the circuit of the clutch-operating solenoid 90 before described will be again closed, resulting in energization of the de-clutching solenoid 90, which will result in release of the clutch and closing of the switch 153.

C. The closing of the switch 153 as a result of clutch-releasing movements of the clutch-operating linkage results in closing of the before-described circuit through the relay 78, energization of which relay results in upward retraction of the latch 86 and consequent shifting out of third speed into neutral.

D. Also as a result of energization of the neutralizer coil 78, the switch 156 is closed and results in the final closing of a circuit for the fourth speed shifter solenoid 59, which circuit was previously initiated by closing of the switch 133 of the relay R4 and is composed as follows: the lead 139 from the battery to the lead 150, the lead 150, the lead 158, part of the lead 162 to and through a lead 171 having interposed therein the fourth speed shifting solenoid 59 and the switch 133 of the relay R4, part of the lead 167 to the lead 163, part of the lead 158 from the lead 163 to the switch 156, the switch 156 and the lead 147 returning to the battery. As a result of this energization of the solenoid 59, the transmission mechanism will be shifted to fourth speed and the contacts 170 of the switch S4 will be broken, thereby interrupting the energizing circuit of the relay R4 which was made through the selector switch contacts 94 and 97, and also interrupting a holding circuit through the relay R4, which was initiated upon closing of the switch 134 of the relay R4. This holding circuit for the relay R4 which was just broken by opening of the contacts 170 of the switch S4 was composed of the lead 139 to the lead 148, the lead 148 to the lead 165, part of the lead 165 to the lead 168, part of the lead 168 a lead 172 including the switch 134 of the relay R4, part of the lead 169 (which includes the switches 138 of the relays R1, R2 and R3 and the coil of the relay R4 and the contacts 170 of the switch S4), part of the lead 166, from the lead 169 to the lead 147, and the lead 147 returning to the battery.

E. As a result of this de-energization of the relay R4, the several switches thereof will be returned to their normal positions, which will result in de-energization of the clutch-operating solenoid 90 which permits the clutch to return to its set driving position and which, in turn, results in opening of the switch 153.

F. This opening of the switch 153 de-energizes the neutralizer solenoid 78. The neutralizer solenoid 78 being now neutralized permits the return of the latch 86 to its lower normal position, during which movement the latch will cam over the free end of the neutralizer arm 69 and come to rest as shown, for example, in Fig. 6.

The manual switch 140 is normally closed both during times of operation and during times of inoperativeness, but is opened for the purpose of rendering the automatic shifting mechanism inoperative to shift the transmission out of any selected speed ratio that it will be in at the time switch 140 is opened. In fact, if this switch 140 is opened when the transmission mechanism is in any one of its four speed ratios, the mechanism will stay in that speed ratio and the automatic mechanism will be inoperative to shift either out of that ratio or to shift into another ratio. However, if the switch 140 be opened at a time that the transmission mechanism is in neutral, there will be no immediate effect in that the mechanism will be free to shift in to the first subsequently selected ratio and will be retained in that ratio until the switch 140 be manually opened, except, however, that the transmission may be manually neutralized while the switch 140 is opened. This switch 140 simply serves, when closed, to shunt around a series of normally closed switch contacts 172 of switch S1, S2, S3 and S4, which are serially interposed in lead 139 when the switch 140 is open. The several switch contacts 172 are serially interposed in a lead 173 that extends from one side of the switch 140 back to the other thereof.

The two position manual switch 143 is under all normal conditions left in the position shown in Fig. 7 wherein the contacts 141 and 142 thereof are closed, but the contact 141 thereof can be moved out of engagement with the contact 142 and into engagement with a contact 174 thereof for the purpose of shunting out the selector switch 93 and energizing a circuit through the coil of relay R4 entirely independent of the switch 93 and which comprises the following, to wit, lead 139 through switch 140 and contacts 141 and 147 of switch 143; lead 175 to lead 169 at a point after the selector switch, lead 169 through the switches 138 of relays R1, R2, and R3 and through relay coil R4 and through contact 170 of switch S4 to lead 166, lead 166 to lead 147 and lead 147 back to the battery. Of course, as soon as the shift is made as a result of energization of shift solenoid 59 into fourth gear or speed, this last made shifter circuit through solenoid 59 will be automatically interrupted by opening of contacts 170 of switch S4 so that the transmission mechanism will essentially remain in fourth gear until switch contact 141 is returned to engagement with contact 142 of switch 143, although the transmission is subject to manual neutralization. It will be obvious that, whereas switch 143 shows only means for manually selecting the fourth speed ratio of the transmission that additional switch contacts and circuits could be provided in identically the same manner for manually selecting any desired number or, in fact, all of the several speed ratios.

The energization circuit of each of the relays R1, R2, R3 and R4 is serially connected with one or the other of normally closed switches 136, 137, and 138 of each of the other three relays. The purpose of this is to positively render three of the four relays inoperative until all the functions assigned to the operation of a previously energized relay have been completed and the first energized relay de-energized. This is a safety feature designed to prevent accidental simultaneous or over-lapping shifting of the transmission mechanism into two speeds as a result of very rapid movement of the selector contact 98 into successive engagement with different selective contacts.

Now that the complete operation of the entire mechanism, as a result of engagement of the selector contact 98 with each of the several selective contacts is understood, a brief summary of the operation of the mechanism appears to be in order to enable the reader to see more clearly the numerous advantageous functions resulting from the novel structure and arrangement of parts described.

Summary of operation

By particular reference to Fig. 8, it will be seen that whereas the selector contact 98 operates on a line radial of the selective contact-carrying disc 99, that the several selective contacts are non-radial, that is, at least, with the exception of one side of selective contact 94 which is on a radial line very close to the radial line indicated at zero miles per hour. Furthermore, it will be noted by reference to Fig. 8 that each of the selective contacts is of varying length, in terms of degrees of rotary movement between the selector contact and selective contacts at different radially spaced points thereon.

At this point, attention is called to the fact that radially spaced concentric broken line circles on Fig. 8 indicate different percentages of accelerator advancement from an idling position toward a position of full throttle. It is also important to note that in the particular embodiment illustrated in Fig. 8, that the several selective contacts 94 to 97 inclusive are not only of varying length in a rotary direction at different radially spaced points, but that the distance, in terms of degrees, of relative rotation between the selector and selective contacts, between each of the circumferentially spaced leading or shifting edges of each successively engaged selective contact under either direction of rotation between the selector and selective contacts is progressively greater from the periphery toward the axial portion of the contacts.

Still further, it will be seen by reference to Fig. 8, that the circumferential distance, in terms of rotary movement between the selector and selective contacts, in which any speed ratio can be maintained in a direction of rotation caused by increased speed is not only increased from the periphery toward the axis of the contacts, but is actually shifted bodily within the overall vehicle speed range of rotation of the disc 99.

From the facts analyzed above and from careful examination of Fig. 8, it will be seen that it is possible by properly designing the selective contacts to automatically shift the transmission mechanism from one speed ratio to another in such relation to vehicle speed and engine power output demand, the latter as determined by accelerator position, that the engine will at all times be operated as closely as possible at its most efficient speed under all different power output demand conditions, consistent with the limitation imposed by the number of speed ratio steps available. For example, it will be seen that at that point of acceleration where the selector contact passes off of the neutral area 108 into the rotary path of the several selective contacts the total vehicle speed range required to shift through all four of the transmission speed ratios occupies a circumferential space on the selective contact disc representing only approximately six M. P. H. of vehicle speed, and it will also be seen that under conditions of maximum acceleration, at which time the selector contact would be on the broken circle marked 100 per cent throttle advancement, the total vehicle speed range required to shift through the four speed ratios occupies a circumferential space representing approximately 85 miles per hour vehicle speed. Furthermore, it should be noted in connection with Fig. 8, that the speed range in which any one of the speed ratios will be maintained increases with accelerator advancement, and that the speed range in which successive speed ratios are maintained is successively greater for each speed ratio from one to four.

Preferably the arrangement is such that at any degree of the advancement of the accelerator, and during increasing speed, the ratio of the speed at which shift will be made out of first speed and into second speed to the speed at which shift will be made out of second speed and into third speed, is equal to the ratio of the reduction of the second gear in the transmission to the reduction of the first gear in the transmission. This relative arrangement is deemed highly important in that it enables the selector switch mechanism to be so designed with respect to the characteristics of any particular engine that the power output of the engine will be as closely balanced to the load demand as is possible, consistent with the limitation imposed by the number of speed ratio steps into which the transmission or shifting mechanism is divided.

By reference again to Fig. 8, it will be seen that under increasing vehicle speed from zero and consequent counter-clockwise rotation of the selective contact-carrying disc, the transmission mechanism will be retained in low gear through approximately 99 degrees of counter-clockwise rotation of the selective contact-carrying disc from its zero position, and which represents approximately 33 M. P. H. of vehicle speed. Under these conditions of maximum acceleration, the selective contact 98 will, of course, be positioned on the smallest broken line circle identified as 100 percent accelerator advancement. Of course, under this condition of maximum acceleration, the shift to second speed will not take place until the vehicle speed of approximately 33 M. P. H. is attained; and the shift from second to third speed would not be attained until the selector contact 98 passed off of the selective contact 95 and on to the selective contact 96, which would come about at a vehicle speed of approximately 55 M. P. H., at which time the selective contact-carrying disc would have passed through approximately 165 degrees of counter-clockwise movement; and the shift out of third speed into fourth speed will be brought about at a vehicle speed of approximately 85 M. P. H., at which time the selective contact-carrying disc will have passed through approximately 255 degrees of counter-clockwise movement from zero speed position.

With an understanding of the action of the device under full acceleration as above described, it is interesting to compare this action with the action of the device under conditions approaching minimum acceleration, or at a time, for example, when the selector contact 98 is positioned on the broken line circle marked 20 percent acceleration. Under this last named condition of acceleration and increasing speed from zero, it will be seen by reference to Fig. 8, that first speed will be maintained through only about 25 degrees of rotation and about 24 M. P. H. vehicle speed, at which point the shift from first to second will take place as a result of only about 42 degrees of counterclockwise rotation, or approximately 14 M. P. H. vehicle speed, and that the shift from second speed to third speed will take place at approximately 58 degrees of counter-clockwise movement of the disc, or approximately 19 M. P. H., and that the shift from third speed to fourth speed will take place as a result of approximately 70 degrees of counter-clockwise movement of the disc 99, or at about 23 M. P. H.

On Fig. 8, arrows extending between different circumferentially spaced broken radial lines are marked to indicate the various different vehicle speeds between which shifts may be made from all different speed ratios to the next adjacent speed ratios under either increasing or decreasing vehicle speed, as a result of varied degrees of acceleration from minimum to maximum.

Another important feature in connection with Fig. 8 is the neutral area 108 on which the selector contact 98 is positioned at all times under conditions of minimum acceleration, and which permits shifting out of any previously selected speed ratio and into any other selected ratio without passing through any intermediate ratio.

Figure 9:
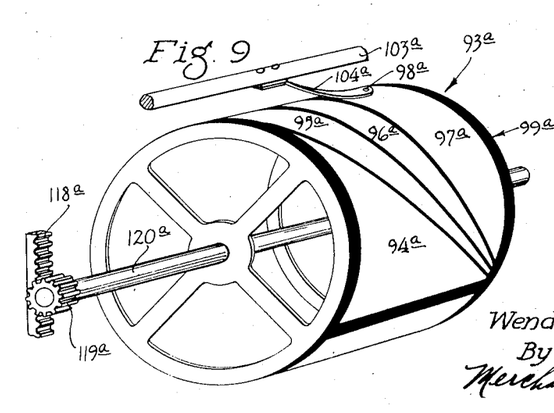
Fig. 9 is a perspective view illustrating a somewhat modified form of selector switch mechanism.
Figure 10:
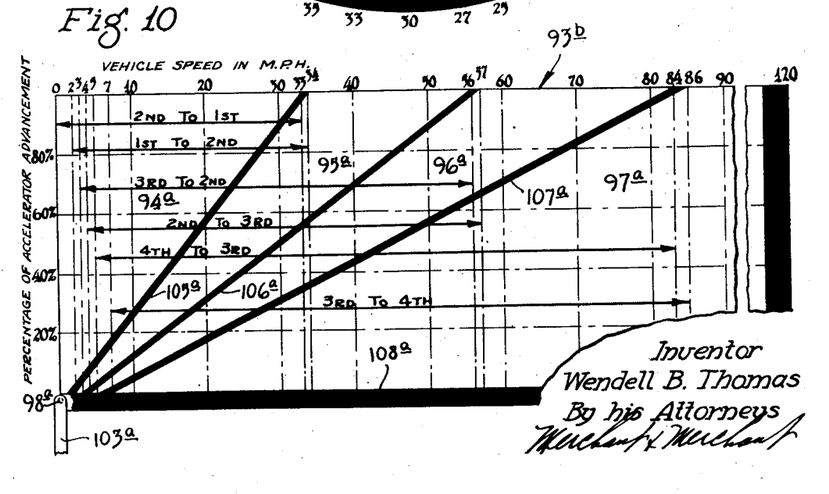
Fig. 10 is a view illustrating the cylindrical selective contact carrying surface of the form of selector switch shown in Fig. 9 laid out in flat form for the purpose of graphically illustrating the operation of a mechanism when the particular form of selector switch of Fig. 9 is employed in place of the selector switch mechanism of Figs. 1, 2, and 8.

*Description and operation Figs. 9 and 10*

In Fig. 9, the selector contact is indicated by 98a, the spring contact finger carrying the contact 98a is indicated by 104a, and the selector contact-carrying guide bar is indicated by 103a. These elements 98a, 104a, and 103a are respectively like the elements 98, 104, and 103 of Figs. 1, 2, and 8. In fact, in Figs. 9 and 10, the entire selector switch mechanism indicated as an entirety by 93a, is adapted to be employed as a substitute for the switch mechanism 93 of the before described figures and hence parts thereof which correspond operatively to certain parts in the before described figures are indicated by the same characters, plus the exponents a. In these last figures the selective contact carrying element indicated by 99a, is in the nature of a rotatable drum carrying on its periphery contacts 94a, 95a, 96a, and 97a, which corresponds respectively to the selective contacts 94, 95, 96, and 97 of Fig. 8, and respectively represents first speed, second speed, third speed, and fourth speed. In this arrangement, the drum is rotated in exactly the same manner as is the disc 99 of Fig. 8, and the selector contact is moved on a line parallel to the axis of the drum. The drum 99a is shown as mounted fast on a shaft 120a that is the equivalent of shaft 120 of Fig. 1, and which shaft may be assumed to be operated from the governor 109 of Fig. 1 through a pinion gear 119a, and a gear rack 118a, said elements 119a and 118a respectively corresponding to the figures 119 and 118 of Fig. 1. In Fig. 10, wherein the selective contact carrying face of the drum is illustrated in flat form, the operation of the device is illustrated as being very closely analogous to that of the selector switch mechanism of Figs. 1 to 8 inclusive. It may be said, however, that in Fig. 10 vertical broken lines are equivalent to the broken radial lines of Fig. 8, and that the longitudinal broken lines are equivalent to the circumferential broken lines of Fig. 8. From analysis of Fig. 10, it will be obvious that the selector contact mechanism could be constructed with a flat selector contact-carrying surface just as illustrated in Fig. 10. In which case, it would simply be necessary to move this surface longitudinally of Fig. 10 under variation in vertical speed, or at least to provide relative movement between selective and selector contacts in this direction. This being just one of numerous possible modifications.

Figures 11, 12, 13:
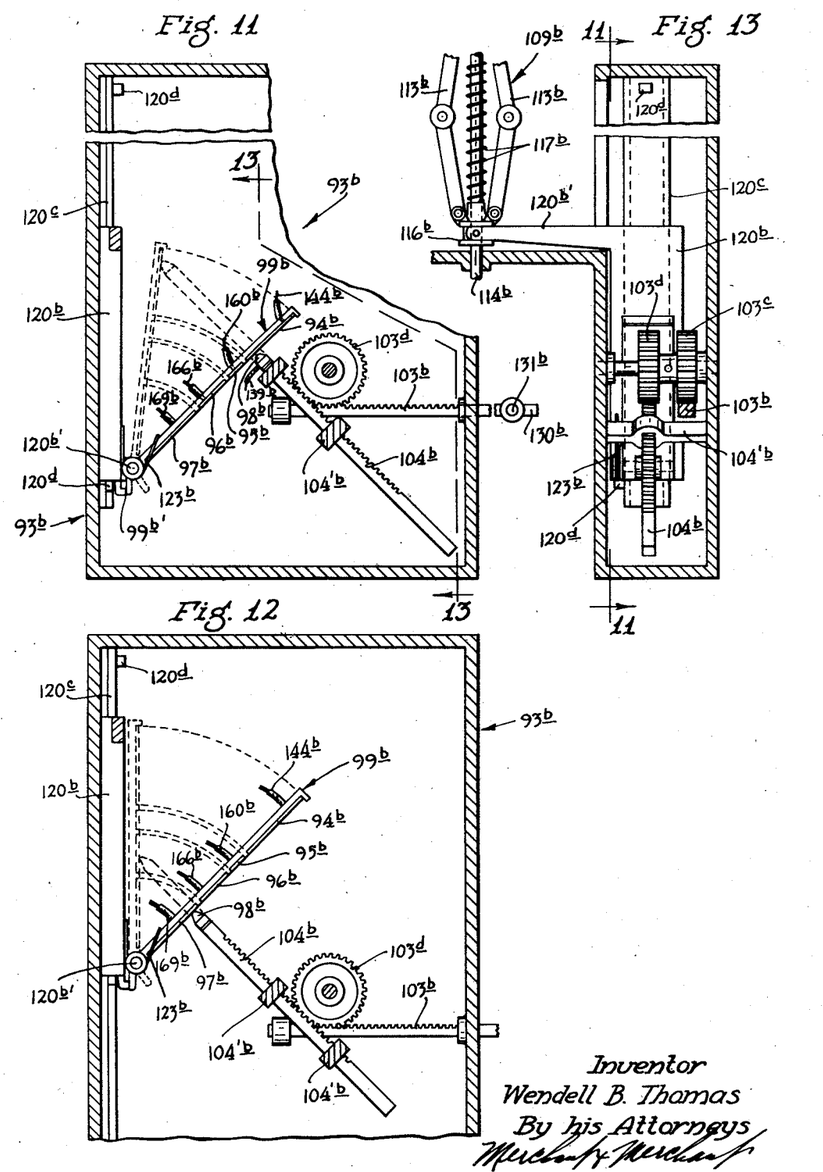
Figs. 11 and 12 are similar views each taken on the line 11—12 of Fig. 13, and illustrating different positions of still another form of selector switch mechanism.
Fig. 13 is a detail view taken on a section line 13—13 of Fig. 11.

These Figs. 11 to 13 inclusive illustrate still a different form of selector switch mechanism, which being adapted to be substituted for the switch mechanism of Figs. 1 to 8 inclusive, is indicated as an entirety by the same numeral as the selector mechanism of Figs. 1 to 8, plus the exponents b, and the various elements thereof are, insofar as possible, indicated by numerals assigned to the corresponding parts in Figs. 1 to 8 plus the exponents b.

Figure 2:
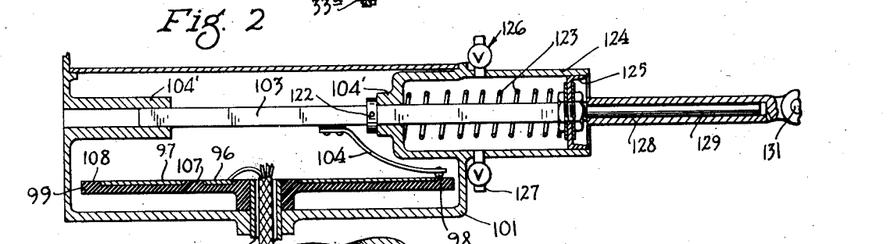
Fig. 2 is a fragmentary view on an enlarged scale of part of the mechanisms shown in Fig. 1.

In this selector switch 93b, the selective contact-carrying element is in the nature of a pivoted arm 99b that is pivotally anchored to a slide bar 120b'. This contact-carrying arm, 99b, which may be assumed to be of insulating material, is provided with selective contacts 94b, 95b, 96b, and 97b, that respectively correspond to the selective contacts 94, 95, 96, and 97, of Fig. 8. The selector contact of this last switch mechanism indicated by 98b is mounted directly on the end of a contact-carrying bar 104b, that is formed with gear teeth and is axially slidably mounted in bearings 104'b. This contact-carrying bar is moved in respect to accelerator advancing and retarding movements through a range including a gear rack 103b and an integrally formed pair of gears 103c, and 103d, which respectively mesh with 103b and 104b. The element 103b may be considered as the equivalent of the element 103 of Figs. 1 and 2, and would be connected up to the accelerator range in identically the same manner. The slide bar 120b is guided for straight line movements on guide flanges 120c. The guide bar 120b is moved back and forth over the guide flanges 120c under variations in vehicle speed between stops 120d by means of a governor 109b that is like the governor 109 of Fig. 1, and the shaft 114b, of which may be assumed to be driven from the shaft 37 of Fig. 1 through connections shown in Fig. 1 for driving shaft 114. Of course, the contact arm 99b is moved on a straight line path of movement with the guide bar 120b. This contact arm is pivotally movable on the guide bar between the extreme positions shown in Fig. 12 and is limited in pivotal movements in a counter-clockwise direction by engagement with cooperating stops 99b'. A spring 123b, which roughly corresponds to the spring 123 of Fig. 2 is provided for yieldingly biasing the contact arm to move pivotally in the direction of engagement of stops 99b'. The guide bar 120b is anchored by an arm 120b' to the element 116b of the governor 109b. Through the action of the governor spring 117b, the guide bar is yieldingly biased in its extreme position against the lower stop 120d, and as a result of centrifugal action of the governor, is progressively moved upwardly toward the upper stop 120b under increased vehicle speed from minimum toward maximum. Under conditions of minimum acceleration and zero vehicle speed, the several parts of the switch mechanism 93b will be positioned as indicated in Fig. 11, in which figure it will be noted that the selector contact 98b is slidingly retracted away from the contact arm 99b, but is opposite the first speed selector contact 94b, the space between the contact surfaces of the contact arm and the selector contact 98b being functionally the equivalent of the neutral area 108 of Fig. 8. To effect a shift into first speed from neutral at zero speed, the operator will simply accelerate the engine slightly, which will bring the selector contact 98b into initial engagement with the selective contact 94b. This will, of course, start the vehicle moving in a forward direction in first speed. Further advancement of the accelerator after initial engagement of contact 98 with the selective contact arm will result in counter-clockwise pivotal movements of the selective contact arm 99b, which pivotal movements will tend to produce a relatively sliding movement of the selector contact 94b toward the top of the contact arm over the surface of low speed contact 94b, but this relative sliding action toward the free end of the contact arm will soon be offset and, in fact, reversed as a result of increased engine speed, which will cause bodily upward movements of the contact arm and a relative pivotal movement thereof back toward its normal position. Under further normal advancement of the accelerator and a normal resultant rate of vehicle speed increase the selector and selective contacts will advance at an approximately uniform rate, any differences being taken up by pivotal action of the arm, on straight line paths that diverge one toward the other, and this divergence will result in relative sliding movement of the selector contact 98b over the engaged surface of the contact arm in a direction from the top toward the bottom of the arm, which, if continued, will result in successive engagement of the selector contact 98b with the selective contacts 95b, 96b, and 97b. Thus successive engagement will, of course, result in a successive shifting through the several transmission speed ratios in a manner similar to the manner described in Figs. 1 to 8. However, should the operator rapidly accelerate at the time when the selector contact 98b is in engagement with any of the selective contacts 95b, 96b, or 97b, a pivotal movement of the arm 99b will follow, and this will result in a rapid sliding action of the contact 98b toward the free end of the contact arm, which will be of such extent as to produce a shift into the next lower speed range or in some instances, through two or more lower speed ranges. In this switch mechanism, as in previously described mechanisms, it is possible to shift from any speed ratio into any other speed ratio without passing through any other immediate speed ratio due to the fact that the selector contact 98b will always retract away from the contact arm under some degree of deceleration and may be brought back into engagement with the receleration under a different speed condition wherein it will re-engage the contact arm on a different selective contact.

Furthermore, in this structure, as in others, the vehicle may be brought to a stop without shifting out of the last selected speed ratio.

In the particular arrangement illustrated in Figs. 11 to 13 inclusive, the straight line paths of movement of the selective switch arm 99b and selector contact 98b diverge in the direction of increased speed at an angle of approximately 45 degrees, the contact arm is mounted for pivotal movements through an arc of approximately 45 degrees between a position wherein it is substantially parallel to its straight line path of movement to a position wherein it diverges outwardly from its straight line path of movement at an angle of approximately 45 degrees, and said switch arm, when in its pivotal outer or normal position, is disposed at approximately 90 degrees with respect to the path of movement of the selector contact. Of course, this angle of the contact arm to the path of movement of the selector contact is varied under accelerating movements of the selector contact of such extent as to produce pivotal movements of the switch arm and this is highly important in that it results in the automatic shifting into lower speed ranges under heavy acceleration.

Referring back again to Figs. 1 to 8 inclusive, attention is directed to the fact that the dash pot 124, sealing cup of piston 125, and slip connections 128 and 129 are provided for the purpose of retarding decelerating movements of the selector contact so as to avoid unnecessary rapid shifting through one or more successively higher speed ranges under very rapid but brief periods of deceleration.

What I claim is:

1. The combination with an engine having a manually operated speed and power controller, a driven member, a variable speed transmission mechanism interposed between the engine and driven member and having a plurality of speed change ratios, of power-operated means for shifting the transmission mechanism from one speed change ratio to another, either in an upshift or downshift direction, and a control mechanism for the power-operated shifting means including a plurality of control circuits each representing a different speed ratio condition of the transmission mechanism, means for selectively controlling said circuits comprising a plurality of spaced contact elements of one class and a single contact element of another class for selective singular engagement with the plurality of contacts of the first noted class, said single contact of the second class selectively cooperating with each of the contacts of the first noted class to control a different one of said circuits, driven member speed controlled means automatically effecting relative contact selecting movements between the contacts of the first class and the single contact of the second class and means responsive to movements of the engine speed and power controller also providing relative contact selecting movements between the contacts of the first class and the single contact of the second class, and so constructed that the interval in terms of driven member speed between any two upshifting operations of the transmission mechanism grows progressively greater with the advancement of said engine power and speed controller, the rate of increase in size of said intervals being determined by the corresponding speed change ratios in said transmission mechanism from which said shifts are made.

2. The structure defined in claim 1 so devised that for any given degree of advancement from minimum to maximum of the said speed and power controller, the ratio of the driven member speed at which one upshift in the transmission mechanism is made to the driven member speed at which the next successive upshift is made, is the same as the ratio of the transmission speed change ratio from which the second shift was made is to the speed change ratio from which the first shift was made.

3. The structure defined in claim 1 so devised that, given the driven member speed of any particular upshifting operation, the driven member speed of any successive shift in the same direction can be determined by the multiplying of the driven member speed at said first shift by the product of the degree of advancement or retardation of the engine power and speed controller from the position at first said shift, and the ratio of the reduction of the speed change ratio in the transmission from which the first shift was made to the reduction of the speed change ratio from which the succeeding shift was made.

WENDELL B. THOMAS.